B. F. MOREY.

Tire for Wagons.

No. 3,518.

Reissued June 22, 1869.

Witnesses.

A. W. Almquist

Wm. A. Morgan

Inventor.

B. F. Morey per Munn & Co

Attorneys

N. PETERS. Photo-Lithographer, Washington, D. C.

United States Patent Office.

BENJAMIN F. MOREY, OF CLINTON, INDIANA.

*Letters Patent No.* 86,029, *dated January* 19, 1869; *reissue No.* 3,518, *dated June* 22, 1869.

IMPROVEMENT IN TIRES FOR WAGONS.

The Schedule referred to in these Letters Patent and making part of the same.

*To all whom it may concern:*

Be it known that I, BENJAMIN F. MOREY, of Clinton, in the county of Vermillion, and State of Indiana, have invented a new and valuable Improvement in Grooved Iron and other Metals; and I do hereby declare that the following is a full, clear, and exact description of the construction and operation of the same, reference being had to the annexed drawings, making a part of this specification, and to the letters and figures of reference marked thereon.

This invention relates to a new and useful improvement in wagon-tires; and

It consists in forming one groove, or more, on one side of the bar, of iron, steel, or other metal, constituting the tire, the said grooved side being on the interior surface of the tire, and designed to be used as a receptacle for oil, when in contact with the flat exterior surface of the felloe.

Similar letters of reference indicate corresponding parts.

A represents the felloe.

B is the grooved iron attached thereto.

The iron or metal may be of any desired size, suitable for a wagon-tire, or bands of any description, where it may be necessary or desirable to use grooved iron, steel, or other metal.

Figure 1:
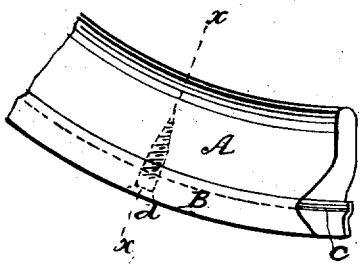
Figure 1 represents a longitudinal section of grooved iron, attached to a felloe or section of the rim of a wheel.
Figure 2:
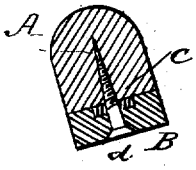
Figure 2 is a cross-section of fig. 1, through the line *x x*.

In the drawings, where the iron is used as a wagon-tire, (and this is, perhaps, the principal use to which the grooved iron would be applied,) *c* represents the groove, its depth being indicated in dotted lines in fig. 1, with its cross-section seen in fig. 2.

The tire or band being shrunk on to the wood in the ordinary manner, will be much less likely to start from the wood than a smooth tire or band, as, in shrinking, the outer angles of the sides of the groove will indent themselves into the wood, and thereby hold the tire to its place.

But this is not the only advantage to be derived from the groove in the iron.

By having one proper aperture, or more than one, through the tire, with a screw or screws which fasten into the wood, as indicated by the wood-screw *d* in the drawing, oil or other liquid may be poured into the groove or grooves from time to time, and be confined therein, by means of which oil or liquid the wood may be kept saturated, and thereby prevented from shrinking and swelling, and from decay.

Instead of a single groove, as represented in the drawing, there may be two or more grooves, with separate holes for oiling, or with such grooves united, so that oil or other liquid may enter all the grooves from one hole.

It will be seen that this will obviate the necessity of so frequently resetting wagon-tires, as the wheel will be prevented from absorbing water, and consequently the ruinous effects of constant swelling and shrinking will be avoided.

This device is susceptible of use for the tires of all wheeled vehicles, including those of wooden wheels for railway-cars, and hoops for barrels and other vessels, constructed with a groove, as described, will keep their places more firmly than others constructed with a flat inner surface.

I am aware that wagon-wheel tires have been grooved interiorly to fit a corresponding rib on the wheel, to prevent lateral displacement of the tire, and I do not, therefore, claim broadly an interiorly-grooved tire; but What I do claim as my invention, and desire to secure by Letters Patent, is—

1. The grooved tire B, combined with the exterior flat surface of the felloe A, substantially as herein shown and described, and for the purpose specified.

2. A tire, or band, having a grooved interior, as described, when designed for use as a receptacle of lubricating-matter upon the exterior surface of cylindrical bodies.

In testimony that I claim the above, I have hereunto subscribed my name, in the presence of two witnesses.

BENJAMIN F. MOREY.

Witnesses:

HENRY A. WHITE,
J. B. HEDGES.